United States Patent [19]
Cagliero

[11] 4,093,747
[45] June 6, 1978

[54] METHOD OF AND FODDER FOR PIG-RAISING

[75] Inventor: Germano Cagliero, Ivrea (Turin), Italy

[73] Assignee: Marxer S.p.A., Turin, Italy

[21] Appl. No.: 785,459

[22] Filed: Apr. 7, 1977

[30] Foreign Application Priority Data

Apr. 23, 1976 Italy .............................. 67990 A/76

[51] Int. Cl.² ................................................ A23K 1/00
[52] U.S. Cl. ...................................... 426/2; 426/623; 426/635
[58] Field of Search .................. 426/807, 2, 623, 635, 426/630, 634; 542/408; 424/285

[56] References Cited

U.S. PATENT DOCUMENTS 3,290,213  12/1966  Carron ................................. 542/408

FOREIGN PATENT DOCUMENTS 1,327,840  4/1963  France ................................. 424/285

*Primary Examiner*—R. B. Penland
*Attorney, Agent, or Firm*—Biebel, French & Nauman

[57] ABSTRACT

Sucking pigs in the weaning state are systematically nourished with a fodder containing 50 to 70 ppm nifuroxazide. The optimal dose is about 60 ppm.

4 Claims, No Drawings

METHOD OF AND FODDER FOR PIG-RAISING

This invention concerns pig-raising, particularly of sucking pigs still in the weaning stage.

It has been found that the use of nifuroxazide as auxinic in pig-raising allows the attainment of weight increases hitherto never reached, with a sensible saving on the fodder administered. In other words, nifuroxazide allows an increase in the utilization of the fodder by the pigs in a surprising way.

Therefore one object of the invention lies in a process for raising pigs in the weaning stage, characterized by systematically nourishing the pigs with a fodder containing from 50 to 70 (preferably about 60) ppm of nifuroxazide. Another object of the present invention consists in a fodder for raising pigs in the weaning stage, characterized by the hereinbefore mentioned content of nifuroxazide, uniformly dispersed in the fodder.

Nifuroxazide, also known as 5'-nitrofurfurylidene-4-hydroxybenzohydrazide, presents the chemical formula:

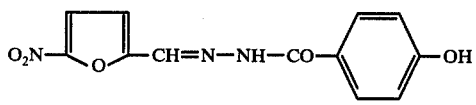

The substance is a microcrystalline, odorless, tasteless, lemon-yellow colored powder, M.P. 296°–299° C (with decomposition). It is insoluble in water, ethyl ether and chloroform, soluble in dimethylformamide, scantly soluble in 95% ethanol, in methanol, acetone and ethyl acetate. It is a furan derivative. Furan derivatives find application in veterinary medicine. In particular, according to some studies, it seems that meat animals affected by diarrhea can be cured with relatively high doses of nifuroxazide amounting to at least 600 ppm and normally ranging around 800 ppm (as referred to the fodder).

(In the present specification, parts and percentages are intended by weight, unless they are expressly indicated differently).

The therapy consists in administering to the animals for a few days during illness a fodder containing the hereinbefore indicated doses of nifuroxazide.

The present invention is based on the discovery that nifuroxazide acts as auxinic when it is administered to sucking pigs in small doses, as hereinbefore indicated, smaller than 10–15 times the antidiarrheic doses, practically for the whole raising period or at least for the largest part of it. It is not a cure for sick animals (affected by diarrhea), but rather a systematic nourishing of healthy animals.

In the past, furazolidone was used as auxinic in pig-raising. However, as it will be seen later on, nifuroxazide yields better results and presents the extremely relevant advantages of not being absorbed by the organism of the animal, and of being deprived of acute and chronic toxicity and of teratogenous activity even if administered in doses twice as great as the therapeutical doses.

PRACTICAL APPLICATION

Tests described later on have been performed on thirty litters for a total of 295 three-week old sucking pigs of the Large White stock, and with an average weight oscillating around 5.5 kg. (see the following Table 3). The animals have been subdivided according to rigid statistical criteria, into five groups of six litters each, hereinafter indicated by numerals from 1 to 5. The raising was carried on in a conventional way and in uniform conditions for all groups and lasted 6 weeks. In the first 3 weeks (1.st period) and in the subsequent 3 weeks (2.nd period) respectively, the animals have been systematically nourished with the fodder whose composition is indicated in Table 1 and whose chemical analysis is indicated in Table 2.

TABLE 1

| Ingredients | 1.st period | 2.nd period |
|---|---|---|
| Corn flour | 13 | 21 |
| Decorticated barley flour flakes | 20 | 19 |
| Decorticated oat flake flour | 18 | 17 |
| Soy flour (44% proteins) | 15 | 13 |
| Fish flour | 5 | 4 |
| Skimmed milk powder | 9 | 7 |
| Corn germ oil cake | 4 | 4 |
| Rice meal | 9 | 5 |
| Dry torula yeast | 1 | 1 |
| Zootechnical sugar | 2 | 2 |
| Ground mineral calcium carbonate | 1 | 1 |
| Di-hydrate di-calcium phosphate (precipitated) | 1.5 | 1.5 |
| Sodium chloride | 0,5 | 0,5 |
| Vitamin and oligomineral complex (°) | 1 | 1 |
| Wheat pollard | — | 3 |
| Total | 100.0 | 100.0 |

(°) Composition:

| | | | |
|---|---|---|---|
| Vit. A | 4.000.000 I.U. | DL-methionine | 20.000 mg |
| Vit. D₃ | 200.000 I.U. | Lysine | 10.000 mg |
| Vit. B₁ | 250 mg | B.H.T. | 1.000 mg |
| Vit. B₂ | 1.000 mg | Co | 100 mg |
| Vit. B₆ | 200 mg | Fe | 30.000 mg |
| Vit. B₁₂ | 7 mg | I | 200 mg |
| Vit. PP | 5.000 mg | Mn | 3.000 mg |
| Vit. K | 250 mg | Cu | 4.000 mg |
| Pantothenic acid | 3.000 mg | Zn | 13.000 mg |
| Choline chloride | 100.000 mg | Vegetal support q.s. to | 1.000 g |

TABLE 2

| | 1.st period | 2.nd period |
|---|---|---|
| Humidity % | 11.75 | 11.88 |
| Ashes % | 6.13 | 6.05 |
| Raw protein % | 21.18 | 19.32 |
| Raw fat % | 3.80 | 3.63 |
| Raw fiber % | 2.54 | 2.69 |
| Non-nitrogenous extracts % | 54.60 | 56.43 |
| | 100.00 | 100.00 |

TABLE 3

| Age (in weeks) | (True average weights) Group | | | | |
|---|---|---|---|---|---|
| | 1 | 2 | 3 | 4 | 5 |
| 3.rd | 5.56 | 5.60 | 5.51 | 5.47 | 5.50 |
| 4.th | 7.68 | 8.05 | 7.73 | 7.65 | 7.74 |
| 5.th | 9.85 | 10.39 | 10.35 | 10.31 | 10.29 |
| 6.th | 12.16 | 12.70 | 12.92 | 12.83 | 12.77 |
| 7.th | 14.72 | 15.01 | 15.57 | 15.45 | 15.39 |
| 8.th | 16.96 | 17.20 | 18.39 | 18.21 | 18.12 |
| 9.th | 19.13 | 19.82 | 21.41 | 21.27 | 21.13 |
| Difference with respect to group 1 (Kg) | — | +0.69 | +2.28 | +2.14 | +2.00 |

Group 1 was considered as control group. Furazolidone was added to the fodders of Group 2 in the ratio of 60 ppm as referred to the fodder weight. Nifuroxazide was added to the fodders of Groups 3, 4 and 5 in the ratio of 60, 80 and 100 ppm respectively. In order to favour the mixture uniformity, the two furane derivatives were used in the form of a premixture with lactose at the 0.5% concentration.

The fodders, in the form of flour, were administered "ad libitum" by means of troughs equipped with a hopper for delivery of the fodder.

The results obtained are summarized in Tables 3, 4 and 5.

Table 3 shows that Groups 3, 4 and 5 have attained, during the 6 weeks of raising, percentage increases of average weight clearly greater than those of Groups 1 and 2. It is interesting to notice that, in comparison with Group 2 fed with furazolidone, Groups 3-5 fed with nifuroxazide showed in the first two weeks a relatively slow increase apparently indicating a certain inferiority of nifuroxazide with respect to furazolidone. But, starting from the 5th week of life (2.nd week of raising), Groups 3-5 showed a sharp recovery indicated by daily weight increases which exceeded appreciably those of Group 2 (see Table 4). Besides it can be noticed from Table 4, that the best values belong to Group 3 (60 ppm of nifuroxazide), while Table 5 shows that the same Group 3 features a fodder consumption (to kg of live weight produced) which is the least among all the groups. Therefore, even though theoretically nifuroxazide could be used at doses of 80-100 ppm, it is apparent that the recommendable dose is in the range from 50 to 70 ppm, that is around 60 ppm.

TABLE 4

| | (Daily weight increases) | | | | |
|---|---|---|---|---|---|
| | Groups | | | | |
| Periods | | 1 | 2 | 3 | 4 | 5 |
| 4.th week | (kg) | 0.302 | 0.350 | 0.318 | 0.311 | 0.320 |
| 5.th week | " | 0.310 | 0.335 | 0.374 | 0.380 | 0.365 |
| 6.th week | " | 0.330 | 0.330 | 0.368 | 0.360 | 0.355 |
| 7.th week | " | 0.366 | 0.330 | 0.379 | 0.375 | 0.370 |
| 8.th week | " | 0.320 | 0.313 | 0.400 | 0.395 | 0.392 |
| 9.th week | " | 0.310 | 0.375 | 0.435 | 0.438 | 0.430 |
| Average increase | " | 0.326 | 0.340 | 0.382 | 0.378 | 0.374 |

| | (compounded integrated fodder consumed each kg of live weight produces) | | | | |
|---|---|---|---|---|---|
| | Groups | | | | |
| Periods | | 1 | 2 | 3 | 4 | 5 |
| 4.th week | (kg) | 1.100 | 1.085 | 1.020 | 1.038 | 1.015 |
| 5.th week | " | 1.128 | 1.100 | 1.080 | 1.100 | 1.108 |
| 6.th week | " | 1.160 | 1.130 | 1.100 | 1.120 | 1.140 |
| 7.th week | " | 1.300 | 1.266 | 1.141 | 1.184 | 1.200 |
| 8.th week | " | 1.349 | 1.302 | 1.207 | 1.239 | 1.246 |
| 9.th week | " | 1.371 | 1.338 | 1.250 | 1.281 | 1.310 |
| average consumption | " | 1.240 | 1.198 | 1.130 | 1.164 | 1.173 |

TOXICOLOGICAL TESTS

A wide toxicological study on nifuroxazide has been performed at the Virology and Immunology Laboratory of the Pharmacy Faculty of Paris, France.

As regards the acute toxicity it has been demonstrated that 4 g/kg in the rats do not cause death and 8 g/kg kill only 30% of the animals. Besides it can be stated that this 30% mortality is not due to the furanic compound as such but to the mechanical action of the large amount of ingested substance.

In the determination of chronic toxicity, always in the rat, with a dose of 100 mg/kg of nifuroxazide for a period of 20 days it has not been possible to detect at the necroscopic examination either macroscopical or histological lesions.

Besides, nifuroxazide administered daily for 6 months to "Rhesus" monkeys and to "Wistar" rats at the dose of 10-250-1000 mg/kg has not determined any toxicity symptom.

A toxicologic study on chickens and rabbits has been performed at the Institute of General Pathology and Veterinary Pathologic Anatomy of Turin, Italy.

As regards the acute toxicity, none of the chickens treated with a 2 g/kg dose of nifuroxazide died; the necroscopic examination has not detected macroscopic or histological lesions.

No cases of death occurred even in the chronic toxicity tests performed for four months and for 6 months by administration with the feed in a dosage respectively 15 times and 16 times greater than the therapeutical one.

The residue control tests performed on the organs of chickens treated for 5 days with 10 and 20 mg/kg respectively of nifuroxazide (therapeutical- and twice the therapeutical dose) showed negative results.

On the acute toxicity tests performed on rabbits of the New Zealand stock, probed for 4 days with 5 g/kg of nifuroxazide, all the subjects survived without displaying any particular symptomatology.

Besides, administration of nifuroxazide incorporated in the ratio of 1% in the diet of rabbits of the white neozealandese stock for the duration of three months did not cause occurrence of any particular symptomatology.

The hematological and hematochemical examinations of the percentage weight of the organs and the necroscopic and anatomo-pathological examination, did not detect any particular alteration related to the treatment.

TERATOGENETICAL TESTS

This study was performed at the Consultox Laboratories of London on 90 rabbits of the Dutch Belted stock and on 150 mice of the Charles River stock.

Nifuroxazide administered to rabbits from the 6.th to the 18.th day of pregnancy at the dose of 250-500-1,000 mg/kg and to mice from the 6.th to the 15.th day of pregnancy at the dose of 500-1,000-2,000 mg/kg did not exhibit any teratogenous activity.

PHARMACOKINETICAL STUDY

This study was performed at the Pharmacy Faculty of Paris, France, by the following methodologies:
determination of nifuroxazide in the intestine after a certain period from its administration, sufficient to allow its passage into the blood,
determination in the blood at different time intervals from the administration.

The first experiment consists of introducing into the small intestine of anesthesized rat an exact amount of nifuroxazide, through a small incision at the duodenum region. After a certain period of time (5 hours), in relation to the normal duration of the intestinal transit, the amount remaining in the intestine is determined.

Having treated 5 animals in the hereinbefore mentioned way the following results have been obtained:

| Amount of nifuroxazide | | |
|---|---|---|
| Administered | Found | % Found |
| 66 mg | 67 mg | 101.3 |
| 67 mg | 64 mg | 95.5 |
| 52.5 mg | 50 mg | 95.2 |

-continued

|  | Amount of nifuroxazide | | |
|---|---|---|---|
|  | Administered | Found | % Found |
|  | 65 mg | 66.5 mg | 102.2 |
|  | 62 mg | 64 mg | 103 |
| Average | 62.5 mg | 62.3 mg | 99.4 |

The results show that, taking into account any errors made during the experiment and the sensitivity of the method, practically all the nifuroxazide which has been introduced is found again in the intestine, even after 5 hours.

Rats weighing 150–180 g treated with 1 ml of a 10% suspension of nifuroxazide (100 mg) have been used for the search of nifuroxazide in the blood; blood samples were taken from the rats 1 hr, 2 hrs and 3 hrs after administration of the compound. Notwithstanding this maximum dosage, it has not been possible to evidence the presence of nifuroxazide in the blood of these animals by a method which allow detection of a concentration as low as 1 $\mu$g/ml.

Further experiments performed on the blood of dogs treated orally with massive doses of nifuroxazide (200 mg/kg), as well as on the blood of subjects treated with doses slightly greater than the usual therapeutical doses, have given negative results, eventhough the analytical method allowed detection of a hematical concentration of nifuroxazide of 0.4 mg/ml.

Nifuroxazide kinetics is therefore limited to an intestinal transit with no absorption.

I claim:

1. Method of increasing the growth rate of pigs in the weaning stage, comprising feeding the pigs with a fodder containing from 50 to 70 ppm of nifuroxazide.

2. Method according to claim 1, wherein the proportion of nifuroxazide is 60 ppm.

3. A fodder for improving the growth rate of pigs in the weaning stage, containing from 60 to 70 ppm of nifuroxazide substantially uniformly dispersed therein.

4. A fodder according to claim 3, wherein the proportion of nifuroxazide is 60 ppm.

* * * * *